United States Patent [19] [11] 4,418,143
Bergthaller et al. [45] Nov. 29, 1983

[54] COLOR PHOTOGRAPHIC RECORDING MATERIAL

[75] Inventors: Peter Bergthaller; Günther Schenk, both of Cologne; Gerhard Wolfrum, Odenthal-Leverkusen; Hans-Volker Runzheimer, Odenthal-Gloebusch; Holger Heidenreich, Cologne, all of Fed. Rep. of Germany

[73] Assignee: Agfa-Gevaert Aktiengesellschaft, Leverkusen, Fed. Rep. of Germany

[21] Appl. No.: 351,103

[22] Filed: Feb. 22, 1982

[30] Foreign Application Priority Data

Feb. 27, 1981 [DE] Fed. Rep. of Germany ....... 3107540

[51] Int. Cl.³ .......................... G03C 7/00; G03C 1/40; G03C 1/10
[52] U.S. Cl. .................... 430/562; 430/223; 430/226
[58] Field of Search ............... 430/222, 223, 225, 226, 430/241, 242, 561, 562, 563

[56] References Cited

U.S. PATENT DOCUMENTS 4,142,891  3/1979  Baigrie et al. ............... 430/223
4,183,754  1/1980  Chapman et al. ........... 430/223
4,195,994  4/1980  Chapman ................... 430/223
4,287,292  9/1981  Chapman et al. ........... 430/223

Primary Examiner—Richard L. Schilling
Attorney, Agent, or Firm—Connolly and Hutz

[57] ABSTRACT

Azo dyes of formula II are released on development from dye releasers which are associated with a light-sensitive silver halide emulsion layer. The azo dyes are chelatable and form with metal ions blue or cyan dye-metal-complex image dyes.

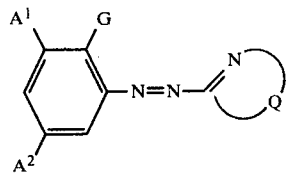

In the formula $A^1$ and $A^2$ represent electronegative substituents whose meta-sigma values $\sigma_m$ (according to D. H. McDaniel and H. C. Brown in J. Org. Chem. 23, 420 et seq (1958) conform to at least one of the following three relationships:

1. $\sigma_m(A^1)$, $\sigma_m(A^2)$    +0.33
2. $\sigma_m(A^1) + \sigma_m(A^2)$    +0.75;
3. $\sigma_m(A^1)$ +0.33 and $A^2$ represents —$SO_2^X$ X represents H, —OH, —$NH_2$, —NH—Y or a cyclic amino group, and Y represents alkyl, aryl, alkylsulfonyl, arylsulfonyl or acyl Q represents a group for completing a 2-amino-3-hydroxypyridine ring, a 4,5-diphenylimidazole ring or a 4-hydroxyisoquinoline ring which is attached through the 1-position; and G represents a group capable of chelate formation.

5 Claims, No Drawings

COLOR PHOTOGRAPHIC RECORDING MATERIAL

This invention relates to a color photographic recording material for the production of color images by the dye diffusion transfer process, containing a non-diffusible color-providing compound associated with at least one light-sensitive silver halide emulsion layer, from which compound a diffusible azo dye capable of complex formation is released in the course of development.

The dye diffusion transfer process is based on the fact that, when a light-sensitive element is developed after exposure, a diffusible dye is produced in imagewise distribution in accordance with this exposure and is transferred to an image-receptor element. It is known that in some cases the lightfastness of color images produced by such a process may be improved by using dyes which are capable of complex formation with metal ions, e.g. tridentate azo dyes. These dyes form stable dye-metal complexes when subsequently treated with suitable metal ions. Methods whereby the lightfastness of azo dye images which have been produced by the dye diffusion transfer process or some other photographic process, e.g. the silver dye bleaching process, may be improved by complex formation with metal ions has been disclosed, for example, in German Auslegeschrift Nos. 1,116,532 and 1,125,279.

German Offenlegungsschrift No. 2,740,719 describes non-diffusible color-providing compounds (dye releasers) which, in the process of development release diffusible, metallizable azo dyes corresponding to the following general formula I

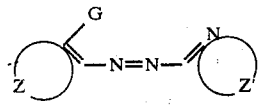
(I)

wherein
represents the atoms required for completing an aromatic, carbocyclic or heterocyclic nucleus having at least one ring with from 5 to 7 atoms;

Z' represents the atoms required for completing a heterocyclic ring; and

G represents a group capable of forming a metal chelate.

If in such dyes the atoms represented by Z' complete a 2-amino-3-hydroxypyridine group or a 4-hydroxyisoquinoline group which is linked through the 1-position, the metal complex image dyes obtained after metallization with nickel or copper ions have a dull color tone which is in no way comparable to that of the known cyan image dyes, such as phthalocyanine dyes or 4-(4-nitro-phenylazo)-1-naphthol dyes. The loss in quality vitiates the advantages of rapid diffusion and higher light fastness and stands in the way of technical application of these compounds.

Even more important is the disadvantage of unsatisfactory absorption in the case of 2-(5-nitro-2-pyridylazo)-1-naphthols mentioned in German Offenlegungsschrift No. 2,740,719 and in U.S. Pat. Nos. 4,147,544 and 4,165,238 and the 2-(5'-sulfamoyl-2-pyridylazo)-4-alkoxy-1-naphthols and 2-(benzothiazolylazo)-1-naphthols mentioned in U.S. Pat. Nos. 4,204,870 and 4,207,104, which prove to be so-called "fugitive" cyan dyes due to the high side densities thereof in the wavelength range of blue light.

It is an object of the present invention to provide readily diffusible monoazo dyes which are capable of subsequent metallization and are distinguished by the exceptionally clear cyan color tones of the nickel or copper complexes obtained from them.

It has been found that this problem may be solved by a particular substitution, which has not hitherto been described in dyes known in the art for the dye diffusion process, carried out in the ring of general formula I which is completed by Z.

The present invention relates to a color photographic recording material for the production of color images by the dye diffusion transfer process, containing, associated with at least one light-sensitive silver halide emulsion layer, a non-diffusible color-providing compound from which a diffusible azo dye capable of complex formation with metal ions is released under the conditions of alkaline development as a function of the development of the silver halide emulsion layer, characterized in that the azo dye corresponds to the following general formula II:

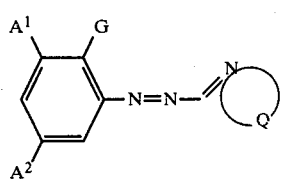
(II)

wherein
$A^1$ and $A^2$ either represent electronegative substituents for whose meta-sigma values $\sigma_m$ (according to D. H. McDaniel and H. C. Brown in J. Org. Chem. 23, 420 et seq (1958)) are defined as follows:
$\sigma_m = \log K_m - \log K°$ where
$\sigma_m$ is a constant for a given substituent (metal in this case)
$K_m$ is the ionization constant for a meta substituted benzoic acid in water at 25° C. and
$K°$ is the ionization constant for the benzoic acid itself,
and at least one of the following two relationships applies:
1. $\sigma_{m(A1)}, \sigma_{m(A2)} \geq +0.33$
2. $\sigma_{m(A1)} + \sigma_{m(A2)} \geq +0.75$;

or $A^1$ represents an electronegative substituent having a $\sigma_m$-value $\geq 0.33$ and $A^2$ represents a group $-SO_2-X$ where X represents H, $-NH_2$, $-NH$—alkyl, $-NH$—aryl, $-NH$—acyl, $-NH-SO_2$—alkyl, $-NH-SO_2$—aryl, a cyclic amino group or $-OH$;

Q represents a group for completing a 2-amino-3-hydroxypryidine group, a 4,5-diarylimidazole ring or a 4-hydroxyisoquinoline ring which is linked through the 1-position; and G represents a group capable of chelate formation, in particular OH.

The following are examples of suitable electronegative substituents $A^1$, $A^2$:
halogen, in particular F, Cl and Br;
$-NO_2$, $-CN$, $-CF_3$, $-OCF_3$,
$-CO-R$ (R represents H, alkyl or aryl),
$-COOR$ (R represents alkyl), e.g. $-COOC_2H_5$ or
$-CO-NR^1R^2$ ($R^1$ represents H, alkyl or aryl; $R^2$ represents H or alkyl or;

$R^1$ and $R^2$ represent groups for completing a 5- to 7-membered cyclic amino group optionally containing a further heteroatom), —$SO_2$—R ($R_2$ represents alkyl or aryl), —$SO_2$—$NR^1R^2$ ($R^1$ represents H, alkyl, aralkyl or aryl; $R^2$ represents H or alkyl; or $R^1$ and $R^2$ represent groups for completing a from 5- to 7-membered cyclic amino group optionally containing a further heteroatom), or

($R^1$, $R^2$ represent alkyl; or $R^1$ and $R^2$ represent 1,2- or 1,3-alkylene).

The above-mentioned alkyl groups represented by R, $R^1$ or $R^2$ have from 1 to 4 carbon atoms. The above-mentioned aryl groups are mainly phenyl and tolyl. The above-mentioned alkyl and aryl groups may also contain further substituents, e.g. a sulfamoyl or sulfinate group. The cyclic amino group completed by $R^1$ and $R^2$ in the definition of —$CONR^1R^2$ and —$SO_2NR^1R^2$ may, in particular, be a pyrrolidine, piperidine or morpholine group. The alkylene group represented by $R^1$ and $R^2$ in the definition of

is preferably ethylene or 1,3-propylene. An acyl group represented by $R^1$ in the definition of —$SO_2$—$NR^1R^2$ may, in particular, be derived from aliphatic or aromatic carboxylic acids.

The heterocyclic groups completed by Q may contain further substituents, in particular, for example, a functional group resulting from the splitting reaction and remaining with the dye which has been split off. The 2-amino-3-hydroxypyridine ring may be substituted, for example by alkyl or halogen. The amino group of the 2-amino-3-hydroxypyridine group may be a primary or secondary amino group. In the 4,5-diarylimidazole ring, possibilities of substitution exist mainly in the two aryl rings; these are preferably phenyl rings, which may be substituted, for example by amino, alkoxy or sulfonamide groups. The 4-hydroxyisoquinoline ring is preferably substituted in the 3-position, e.g. by alkyl, alkylthio or alkoxy.

The group capable of chelate formation is one which in the presence of metal ions actively takes part in the formation of an azo dye (tridentate)-metal complex or a group which under the conditions of alkaline development is capable of being converted into such a group, e.g. by hydrolysis. These groups preferably have the chelate forming centre thereof directly attached to the benzene ring which carries them. Below are examples of suitable groups capable of chelate formation:

—OH, —O—acyl, —NH—$SO_2$—$CH_3$,

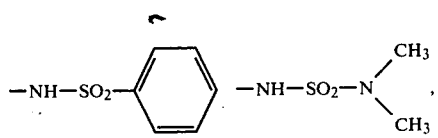

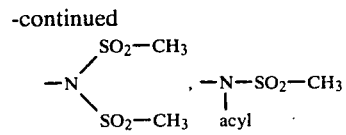

wherein acyl represents the acyl group derived from an aliphatic or aromatic carboxylic acid or from a carbonic acid monoester.

In addition, the dyes corresponding to general formula II containing functional groups or providing suitable diffusion and mordanting conditions, e.g. in the form of groups mentioned above for $A^1$, $A^2$ and G or in the form of substituents optionally attached to these groups through a suitable linking member, e.g. anionic or anionisable groups, such as sulfonate, sulfinate, phenolate, disulfimide, carboxylate or sulfamoyl groups, as well as at least one functional group which results from the breaking of a bond by which this group was attached to a carrier group having a ballast group, and which is characteristic of the nature of the carrier group and the bond by which it was attached to the carrier group. The last-mentioned functional group may be the same as the above-mentioned groups which modify the diffusion and mordanting characteristics. This functional group may be attached to, for example, an alkyl or aryl group which in turn forms part of an electronegative substituent mentioned for $A^1$ and $A^2$, but is may also be present as substituent on an alkyl, aryl or hydrolysable acyl group in one of the groups G which are capable of chelate formation. Alternatively, it may be attached to the heterocyclic ring which is completed by Q.

The chromophores forming the basis of the dyes corresponding to general formula II are in part known, but dyes having the pattern of substitution described here, with the phenyl part containing two electronegative substituents in the meta-position to the azo bridge, have not hitherto been used in color photographic recording materials. In German Offenlegungsschrift No. 2,740,719 it is even explicitly stated that particularly advantageous cyan dyes are obtained if the phenyl ring represented therein by Z carries a nitro group in the para-position to the azo group.

All the more surprising was it therefore to find that the absorption curves of nickel and copper complexes of the dyes according to the present invention present a much more advantageous picture, more suitable for clear color separation, if the phenyl part Z of general formula I contains a combination of two electron acceptor groups in the ortho- and para-position to the chelate-forming group G instead of containing an electron acceptor group in the para-position to the azo bridge, and if the sum representing the combined electron attraction acting on the azo bridge reaches or exceeds the numerical value 0.75. An explanation of the physical significance of the $\sigma_m$ value of Hammett may be found in the article by D. H. McDaniel and H. C. Brown in J. Org. Chem. 23, pages 420–427, in particular page 425, and in the article by Ritchie and Sager, Prog. Phys. Org. Chem. 2, pages 323–400 (1964).

Groups corresponding to the following general formula:

—$SO_2$—X wherein X represents H,—OH, —NH—$SO_2$—alkyl, —$NHSO_2$—aryl or —NH—acyl constitute a special case. These groups are deprotonated at pH>2 and the electronegative character thereof is only inadequately expressed by the classical $\sigma$ meta values of McDaniel and H. C. Brown. It has surprisingly been found that the absorption spectra of metal complexes with sulfo or disulfimide groups correspond very acurately to those of dyes containing sulfonamide groups, especially when $A^1$ represents an electron acceptor group as described above and $A^2$ represents a group $-SO_2-X$.

It must be pointed out in this connection that the presence of groups having an electron acceptor character in the ortho- or para-position to the chelate-forming group should, according to conventional ideas about the relationship between structure and reactivity, result in a lowering of the electron donor character of the chelate-forming group G so that a loss in stability of the complex would be expected. It is in every respect surprising that this phenomenon does not occur. The metal chelates formed with the aid of dyes corresponding to general formula II are found to function as image dyes which have excellent stability against a fall in pH in the photographic layer. In addition, these dyes are instantly metallized on contact with nickel or copper ions.

It is surprising that the advantageous spectral characteristics of the cyan nickel or copper chelates of dyes corresponding to general formula II are limited to the type of substitution described above and could not be found, for example, in chelates obtained from dyes corresponding to general formulae III, IV or V. In these cases, high side absorptions occur in the green and blue spectral region in the same way as in the known dyes and in addition the shortwave sides of the longwave absorption bands are flatter. The dyes are also duller as a whole if the absorption maximum is in the longwave position

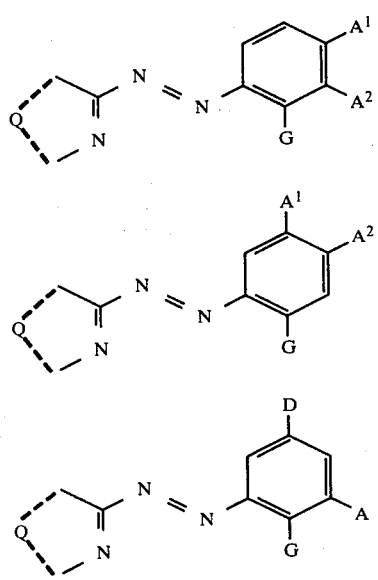

(III)

(IV)

(V)

wherein
D represents a group having an electron donor character or a weak electron acceptor character, characterised by a $\sigma_m$ value of $\leq 0.21$.

It is a characteristic of the dyes corresponding to general formula II according to the present invention that the absorption spectra of the dyes are shifted towards shorter wavelengths. Alkali-liable blocking of the chelate-forming group G by acyl groups or related protective groups is not necessary to produce this effect although acylation does cause a further shift of absorption of the chromophore towards shorter wavelengths. In addition, it generally reduces the intensity of color so that absorption of the layer having the non-diffusible color providing compound incorporated therein does not interfere with sensitisation of the associated silver halide emulsion layer due to a filter effect.

General formula II represents diffusible dyes according to the present invention which are released in the course of development. They are released from the corresponding embedded non-diffusible color providing compounds (dye releasers). These are compounds in which a dye residue corresponding to general formula II is attached to a carrier group (CAR) containing at least one ballast group, optionally with interposition of a suitable connecting link. The dye corresponding to general formula II may be attached to the carrier group by way of, for example, one of the two electronegative substituents $A^1$ and $A^2$ or the group G which is capable of chelate formation, or the heterocyclic ring which is completed by Q. The dye releasing compounds according to the present invention may thus be represented by the following general formula VI:

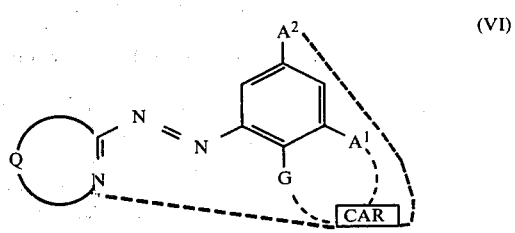

(VI)

wherein,
Q, $A^1$, $A^2$ and G are as defined above;
CAR represents a carrier group containing at least one ballasting group which confers diffusion resistance; and the broken lines indicate possible linking positions. In the dye releasers according to the present invention, therefore, the carrier group is present as a substituent on the heterocyclic ring completed by Q, or it is contained as substituent in one of the groups represented by $A^1$, $A^2$, or G.

In addition to containing the ballasting group, the carrier group CAR contains at least one group which is capable of being split as a function of the development of a silver halide emulsion layer so that the dye attached to the carrier group, optionally together with a small fragment of the original carrier group, is separated from the ballasting group and may thus be released from its attachment to the layer. The carrier groups may have varying structures depending on the mode of function of the group capable of splitting.

The dye releasers according to the present invention may be, for example, non-diffusible color couplers which carry a dye residue according to the present invention in the coupling position and release this residue as a result of chromogenic coupling. Such releasing mechanisms have been described, for example, in German Pat. No. 1,095,115 and U.S. Pat. No. 3,227,550.

Particularly suitable dye releasers are found to be the redox active compounds corresponding to the following general formula:

BALLAST—REDOX—DYE wherein

BALLAST represents a ballasting group conferring diffusion resistance;

REDOX represents a group which is capable of being oxidized or reduced under the conditions of alkaline development, and which may undergo varying degrees of an elimination reaction, a nucleophilic displacement reaction or hydrolysis, depending on whether it is in the oxidized or the reduced state, with the result that the DYE residue is split off; and DYE represents the residue of a diffusible dye, in this case a dye corresponding to general formula. II.

The ballasting groups are groups which enable the dye releasers according to the present invention to be incorporated in a diffusion-fast form in the hydrophilic colloids conventionally used in photographic materials. It is particularly suitable to use organic groups generally containing straight- or branched-chain aliphatic groups generally containing from 8 to 20 carbon atoms and optionally als carbocyclic or heterocyclic, optionally aromatic groups. The ballasting groups may be either directly or indirectly attached to the remainder of the molecule, e.g. by way of one of the following groups: —NHCO—, —NHSO$_2$—, —NR— wherein R represents hydrogen or alkyl; —O— or —S—. The ballasting group may in addition contain groups conferring solubility in water, e.g. sulfo groups or carboxyl groups, and these may also be present in an anionic form. Since the diffusion properties depend on the molecular size of the compound as a whole, it is sufficient in certain cases, e.g., if the molecule as a whole is large enough, to use only relatively short chain groups as ballasting groups.

Redox-active carrier groups having the structure BALLAST-REDOX and corresponding dye releasers are known in various forms.

Oxidizable dye releasers which undergo hydrolysis after oxidation to release a diffusible dye have been described, for example, in German Offenlegungsschrift Nos. 2,242,762; 2,406,664; 2,505,246; 2,613,005 and 2,645,656 and in the following Research Disclosure publications: No. 15 157 (November 1976), No. 15 654 (April 1977) and No. 17 736 (January 1979). These are predominantly compounds in which a dye residue is attached to an oxidizable carrier group by way of a sulfonamide group. The dye released in the course of development therefore has a sulfamoyl group.

Oxidizable dye releasers which in oxidized form are subject to an intra-molecular displacement reaction to release a diffusible dye have been disclosed, for example, in U.S. Pat. No. 3,443,940. These dye releasers release dyes containing sulfinate groups.

Examples of oxidizable carrier groups which in oxidized form release a dye residue attached to them are represented below:

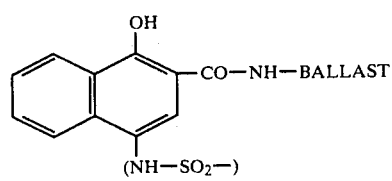

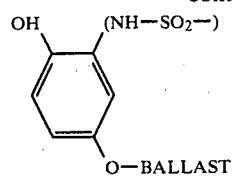

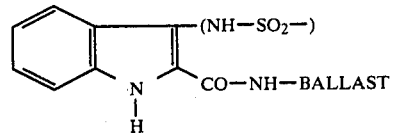

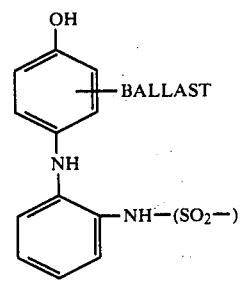

The groups shown in brackets are released together with the dye residue. They remain in the dye as functional groups and may be attached to the dye through an intermediate link.

In the types of dye releasers hitherto mentioned, the dye residues are released at a rate proportional to the rate of formation of an oxidation product by development of silver halide or by catalytic amplification, e.g. with H$_2$O$_2$. This reaction therefore functions on the principle of a negative process and requires reversal for the production of positive images, e.g. by means of direct positive emulsions or by using an arrangement of layers functioning on the basis of silver salt diffusion.

It is particularly advantageous if the structure of the carrier group containing a ballasting group and a redox portion is such that the diffusible azo dye is released under alkaline conditions at a rate approximately inversely proportional to the state of development of the silver halide layer. Such a system functions as a positive system and is suitable for the production of positive images from conventional negative silver halide emulsions. Such dye releasers are also known and are described below.

Oxidizable dye releasers which are stable in the oxidized form, but undergo an intra-molecular nucleophilic displacement reaction in reduced form to release a dye residue have been disclosed, for example, in German Offenlegungsschrift Nos. 2,402,900 and 2,534,902.

Oxidizable dye releasers which are stable in the oxidized form, but release the dye by an elimination reaction when they are in the reduced form have been described in German Offenlegungsschrift Nos. 2,823,159 and 2,854,946.

The mode of operation of the last two mentioned groups of dye releasers may be reversed when such compounds are used, not in reduced form, but in oxidized form. The types of dye releasers mentioned below are obtained in this manner.

Reducible dye releasers which in reduced form are subject to an intramolecular nucleophilic displacement reaction to release a dye residue have been disclosed in German Offenlegungsschrift No. 2,809,716. These compounds are referred to as so-called BEND compounds (BEND="Ballasted Electron-accepting Nucleophilic Displacement").

Reducible dye releasers which are subject to an elimination reaction after reduction to release a dye constitute the subject of published European Patent Application No. 4399 and of British Patent Application No. 80 12242.

Other classes of reducible dye releasers which may undergo reductive splitting by similar reactions to release dyes are the subject of German Offenlegungsschrift Nos. 30 08 588 and 30 14 669.

Examples of reducible carrier groups from which an attached dye residue may be split off by reduction are represented below:

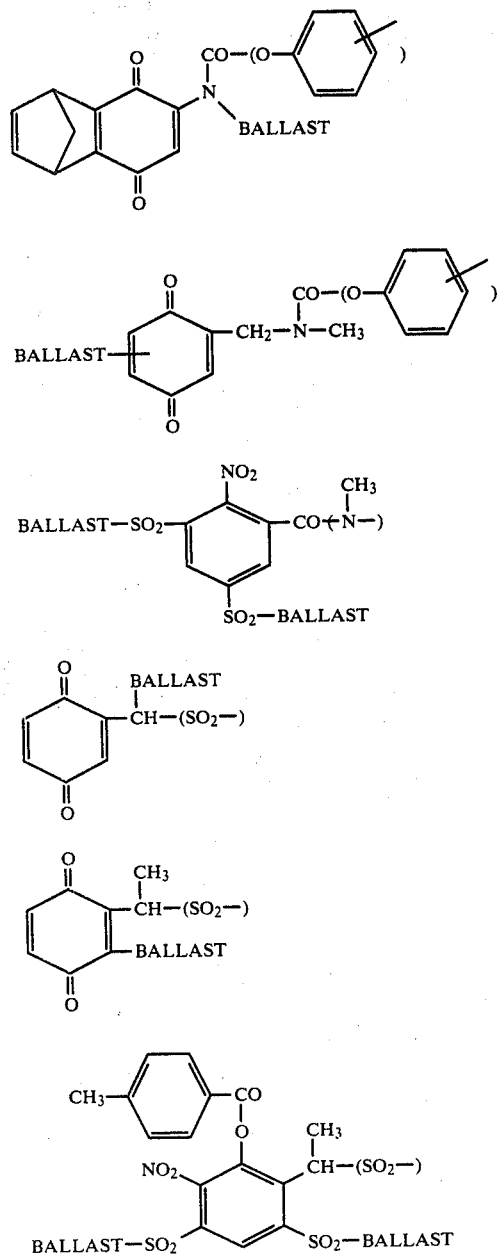

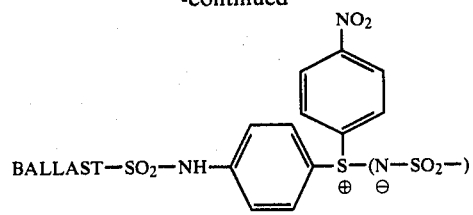

The groups shown in brackets are functional groups of the dye residue and are separated together with this residue from the part of the carrier group which remains behind. These functional groups may be one of the substituents mentioned in the definition of groups $A^1$, $A^2$ or G in general formula II and which have a direct influence on the absorption characteristic and complex-forming characteristics of the dyes corresponding to general formula II according to the present invention. Alternatively, the functional group may be separated from the chromophore of the dye according to the present invention by an intermediate link in that it may be present as substituent in one of the groups defined for $A^1$, $A^2$ or G or on a heterocyclic ring completed by Q without necessarily influencing the absorption and complex-forming characteristics. In some cases, the functional group may be important in combination with the intermediate link to influence the diffusion and mordanting characteristics of the dyes according to the present invention. Examples of suitable intermediate links include alkylene and arylene groups.

The last mentioned series of reducible dye releasers which are split by reduction are suitably used together with so-called "electron donor compounds" (ED compounds). The latter function as reducing agents which are used up imagewise as the silver halide undergoes development, and the unused portion thereof reduces the associated dye releaser, thereby releasing the dye. Suitable ED compounds include, for example, non-diffusible or only slightly diffusible derivatives of hydroquinone, of benzisooxazolone, of p-aminophenol or of ascorbic acid (e.g. ascorbyl palmitate), which have been described, for example, in German Offenlegungsschrift No. 2,809,716. Particularly suitable ED compounds constitute the subject of German Offenlegungsschrift No. 30 06 268.

The following are examples of suitable ED compounds:

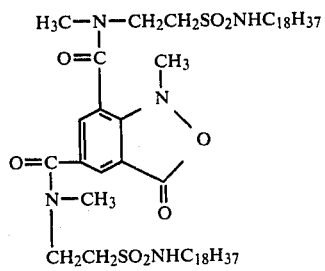

ED 1

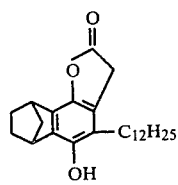

ED 2

ED 3
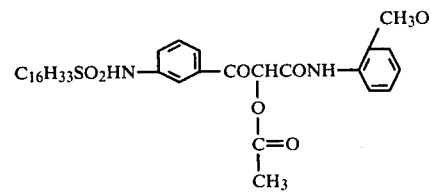
ED 4
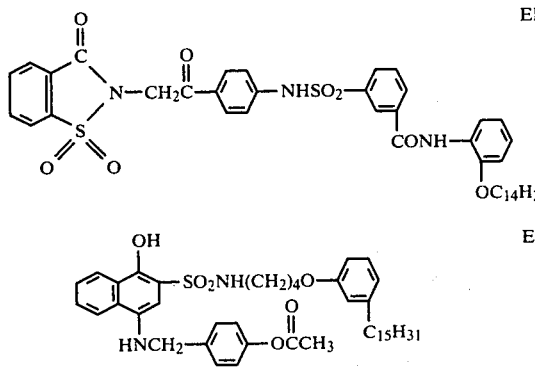
ED 5
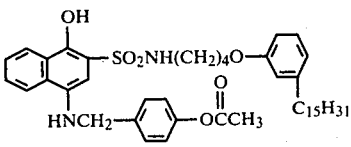
ED 6
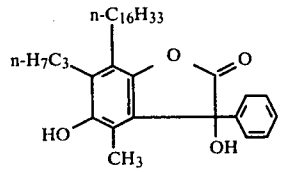
ED 7
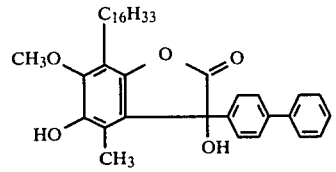
Examples of monoazodyes corresponding to general formula II according to the present invention which are capable of being metallised to cyan nickel or copper complexes having exceptionally advantageous absorption characteristics are given below:
Dye 1
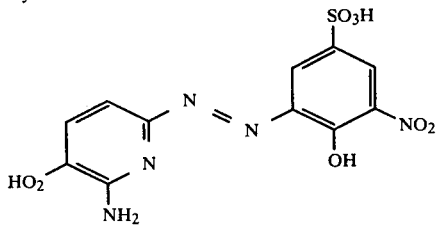
Dye 2
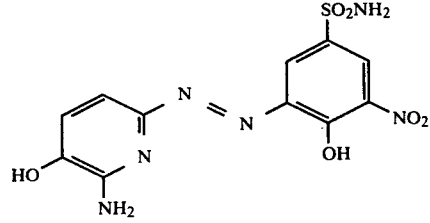
Dye 3
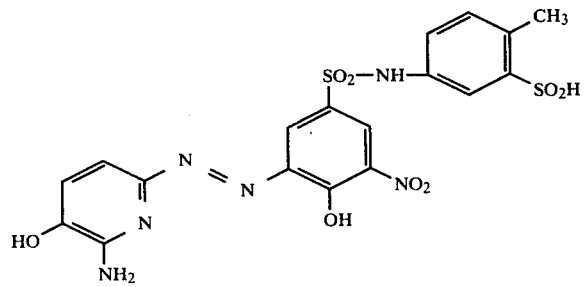
Dye 4
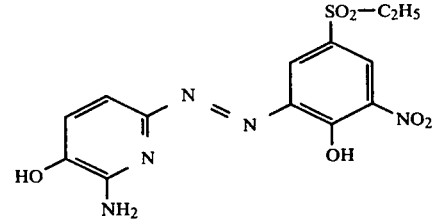
Dye 5
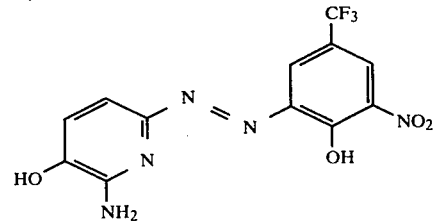
Dye 6
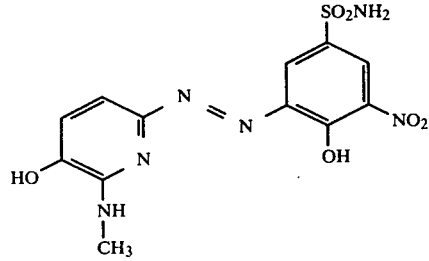
Dye 7
Dye 8

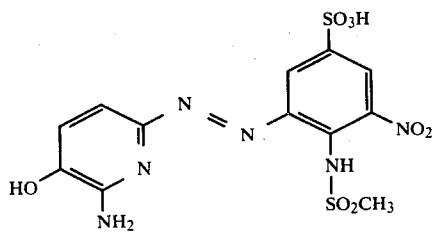
Dye 9
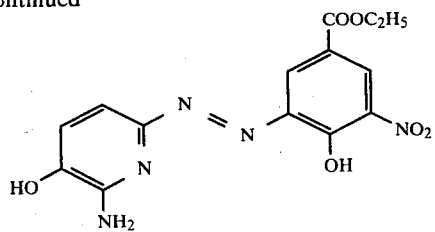
Dye 10
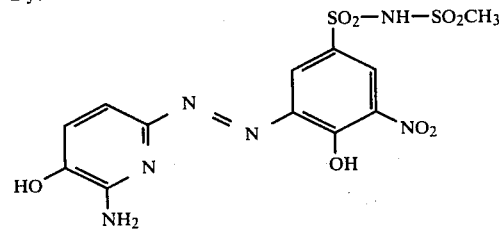
Dye 11
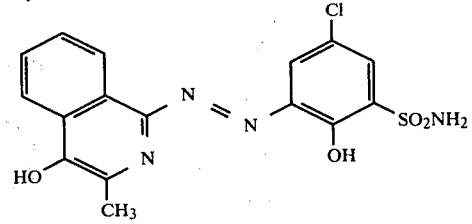
Dye 12
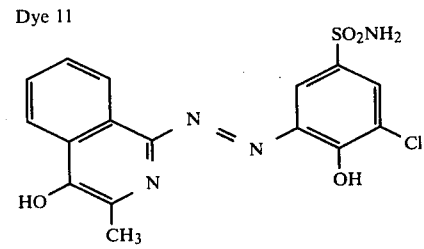
Dye 13
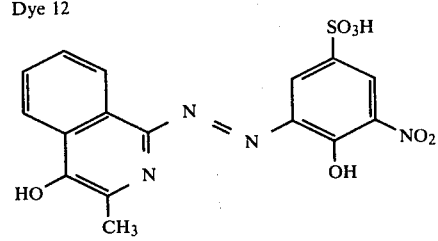
Dye 14
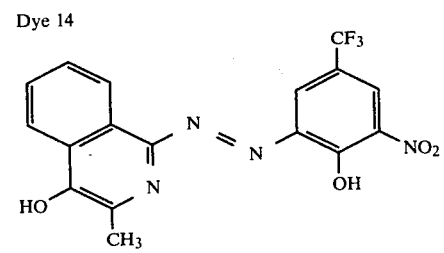
Dye 15
Dye 16
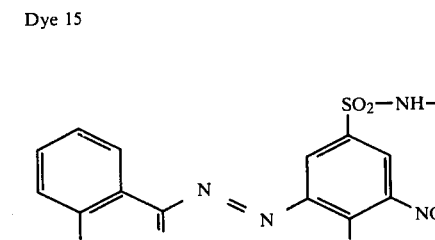
Dye 17
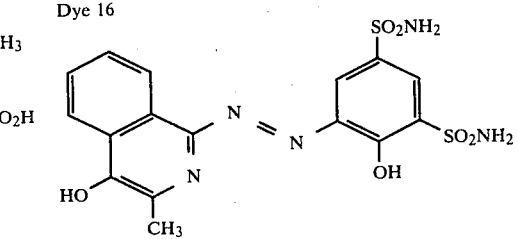
Dye 18
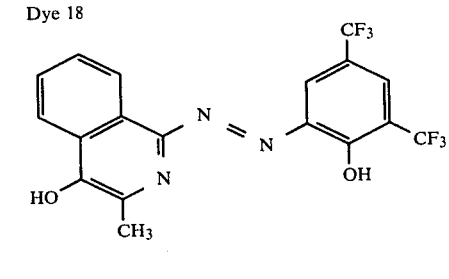

Dye 19
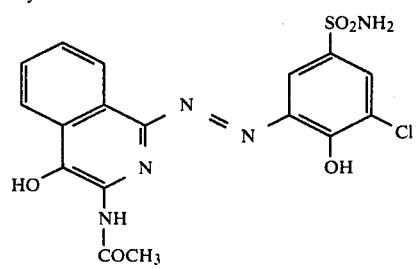
Dye 20
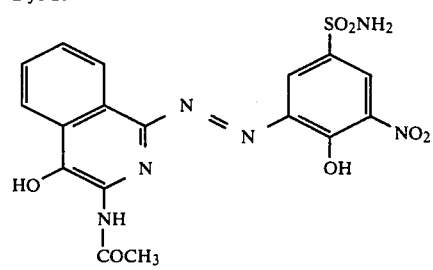
Dye 21
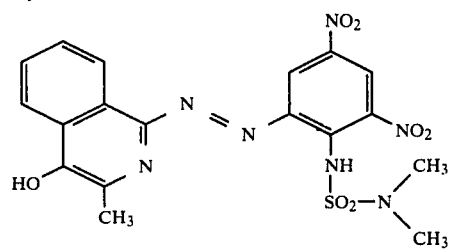
Dye 22
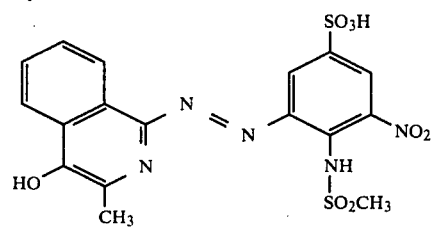
Dye 23
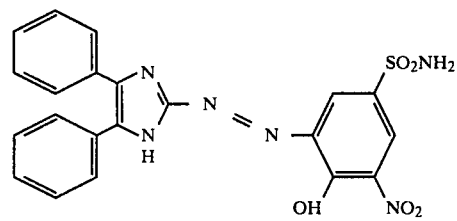
Dye 24
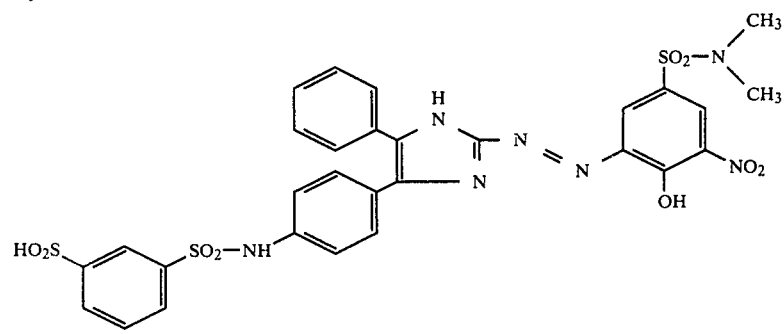
Dye 25
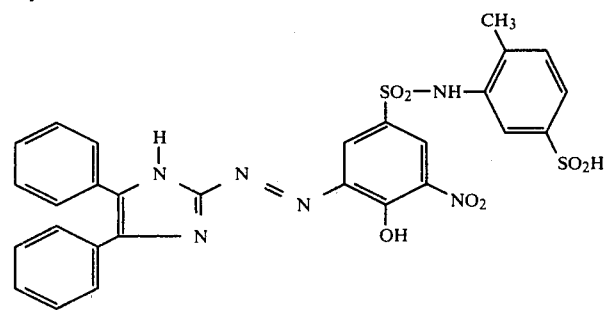
Dye 26

-continued

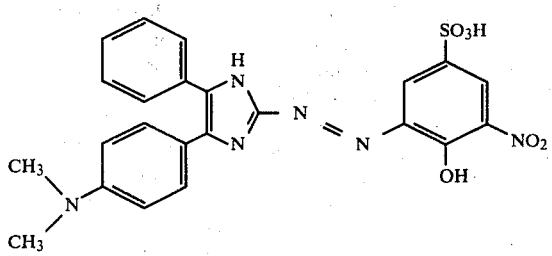

Various 2-aminophenols or 2-sulfamidoanilines doubly substituted by electron acceptor groups or preliminary stages of these compounds, are suitable for the preparation of the monoazo dyes corresponding to general formula II according to the present invention. Thus, for example, a chlorine atom in the ortho-position to the azo bridge may be replaced by OH either during or after diazotization and coupling.

By way of example, the following Table shows a series of compounds which may be used as the diazo portion to prepare the dyes according to the present invention (general formula II) and subsequently, after linkage of said dyes to a carrier group, the dye releasers according to the present invention (general formula VI).

-continued
2-aminophenols and 2-sulfamidoanilines ("amine")

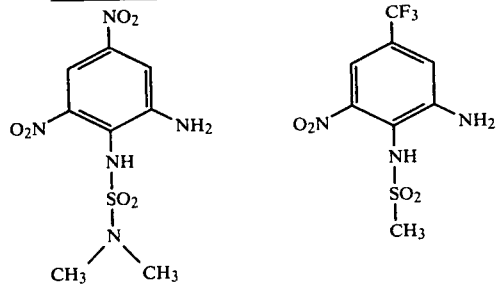

Amine 21, Amine 22

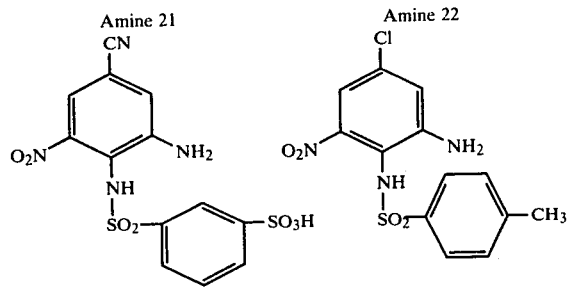

Amine 23, Amine 24

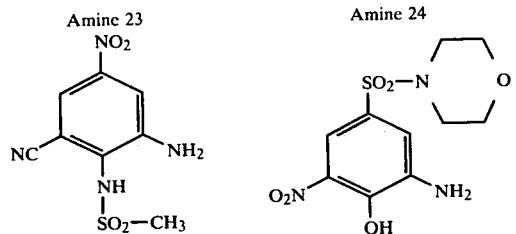

Amine 25, Amine 26

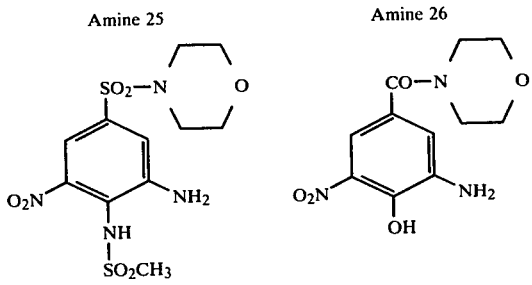

Amine 27, Amine 28

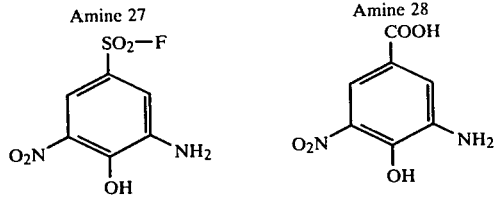

Amine 29

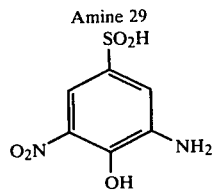

portion, the diazo portion need not contain functions for the formation of a linkage.

Various 2-amino-3-pyridinols, 4-hydroxyisoquinolines substituted in the 3-position, and diphenylimidazoles are suitable couplers for the preparation of the monoazo dyes corresponding to general formula II according to the present invention which may be metallized to cyan nickel or copper complexes having particularly suitable absorption characteristics. Particularly advantageous results are obtained using 2-amino-3-pyridinols in which the amino group is either unsubstituted or at least not substituted by acyl groups.

Various suitable couplers are shown below:

Coupler 1, Coupler 2

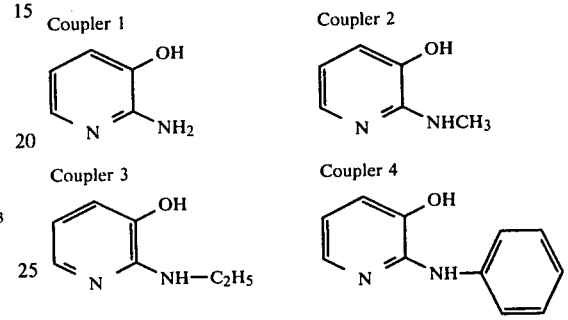

Coupler 3, Coupler 4

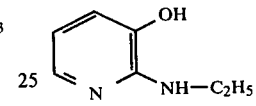
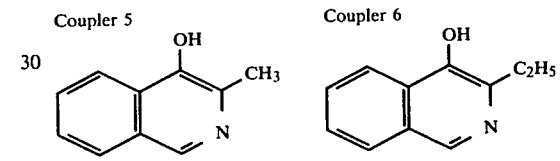

Coupler 5, Coupler 6

Coupler 7

Coupler 8

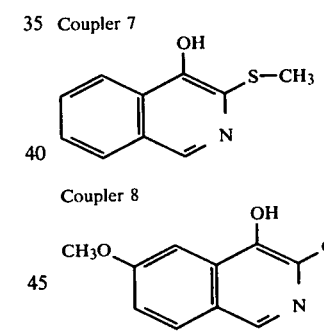

Coupler 9, Coupler 10

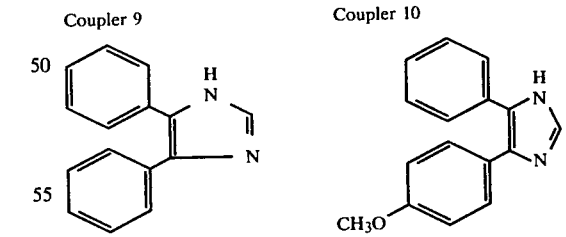

Coupler 11

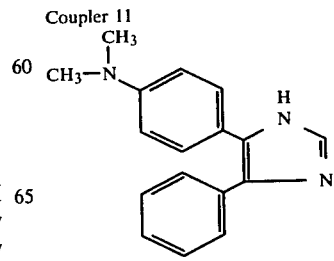

Since the dye corresponding to general formula II need not necessarily be linked to the carrier group by way of the diazo portion (amine portion), but may equally well be linked through the heterocyclic coupler Coupler 12

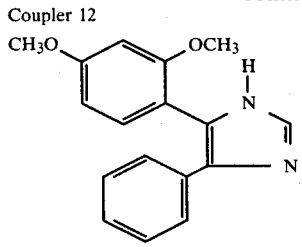

The starting materials (amines and couplers used for the preparation of the dyes corresponding to general formula II which may subsequently be converted into complexes are well known or may be prepared by known processes. Methods of preparation are given below for some of the amines mentioned to illustrate the methods of synthesis employed.

Amine 3: 2-amino-6-nitrophenol-4-sulfonic acid dimethylamide 25 g of acetic anhydride are added to 23.4 g of 2-amino-6-nitrophenol-4-sulfonic acid (0.1 mol) in 450 ml of pyridine on a steam bath with stirring. The mixture is stirred for a further 30 minutes and then suction filtered after it has been cooled to room temperature. The crude diacetyl compound is mixed with 45 g of $PCl_5$ with stirring for 1 hour at 60° C. and poured out on 200 g of ice after cooling. The product is suction filtered and the sulfochloride obtained is recrystallized twice from acetonitrile. Yield: 20 g (73% of the theoretical yield).

Mp. 155° C.: The nuclear magnetic resonance spectrum indicates the constitution of a 2-methyl-benzoxazole sulfochloride (1 methyl signal).

For the reaction with dimethylamine, a suspension of 2 g of the sulfochloride in 6 ml of acetonitrile is mixed with 5 ml of a 45% dimethylamine solution with stirring at room temperature and the mixture is heated on a steam bath for 10 minutes, acidified with 10 ml HCl and 4 ml glacial acetic acid and maintained on the steam bath for a further hour. After the addition of 4 g of sodium acetate, the product precipitates on cooling.

Yield: 1.6, mp.: 176°-180° C.

Saponification of the NH-acetyl group may be carried out equally well in 15% sodium hydroxide solution.

Amine 6: 2-amino-6-nitro-4-trifluoromethylphenol 2,6-Dinitro-4-trifluoromethylphenol (0, 1 mole) is prepared according to Jacobs, J. Org. Chem. 36, 242 (1971) and after the addition of 5 g of $NH_4Cl$, reduced with a solution of 12 g of $H_2S$ in ammonia-saturated methanol at 45° C. The resulting mixture is concentrated by evaporating, extracted with hot isopropanol and again concentrated by evaporation. Minor residues of unreduced 2,6-dinitro-4-trifluoromethylphenol are separated by chromatography on silica gel with dichloromethane as eluent.

Yield: 16 g (77% of the theoretical yield) reddish brown crystals melting between 80° and 85° C.

Amine 11:

Prepared from 2-aminophenol-4,6-disulfonic acid by a method analogous to that used for Amine 3.

Yield: 30% Mp.: 220° C. (decomposition).

Amine 13: 3-amino-5-chloro-salicyclic acid nitrile (a) 5-chlorosalicyclic acid nitrile is prepared by the reaction of 1 mol of 5-chlorosalicyclic aldehyde with the equimolar quantity of hydroxylamine.HCl in pyridine and two hours' heating with 2 mol of acetic anhydride. After the addition of 4 mol of NaOH, the reaction mixture is concentrated by evaporation under vacuum, stirred with water and suction filtered.

(b) Nitration: The residue is introduced into 10 times its quantity of $HNO_3$ (d: 1.40). After 10 minutes the reaction mixture is poured onto ice and suction filtered. The product is recrystallized from methanol.

Yellow needles, Mp.: 200° C.

(c) Reduction: The purified product from (b) is taken up with 10% sodium hydroxide solution and reduced using Fe(II) sulfate with the addition of ammonia. The reaction mixture is filtered to remove black iron hydroxide and concentrated by evaporation under vacuum. The crude product is taken up with methanol and used as evaporation residue.

Amine 18:

4-chloro-3,5-dinitrobenzene sulfonic acid in the form of its potassium salt is stirred with 5 times its molar quantity of methane sulfonamide and potassium carbonate in dimethylformamide at 100° C. The reaction mixture is then concentrated by evaporation and stirred with three times its molar quantity of sodium sulfide in methanol for 2 hours at 55° C. It is boiled for a short time, adjusted to pH 6 using acetic acid and filtered from the sulfur which has separated. It is then again concentrated by evaporation. The red brown crystals which separate are worked up.

Amine 20:

Prepared by reaction of 4-chloro-3,5-dinitro-1-trifluoromethylbenzene with potassium methane sulfonamide in dimethylsulfoxide, followed by reduction by a method analogous to that employed for Amine 18 to yield Amine 20, Mp. 180° C. (with decomposition).

Preparation of Dye 1

1 g of 2-amino-6-nitrophenol-4-sulfonic acid (Amine 7) is diazotized using a solution of 0.37 g of sodium nitrate in 4 ml of water in the presence of 20 ml 10% hydrochloric acid at 0° C. The yellow diazonium solution obtained after removal of the excess nitrite with amidosulfonic acid is added dropwise to an ice cold suspension of 0.8 g of 2-aminopyridinol-3 (coupler 1) and 13 g of potassium carbonate in 20 ml of water, and the mixture is stirred overnight. It is then adjusted to pH 6 using acetic acid, and 20 ml of saturated potassium chloride solution are added. The reaction mixture is suction filtered after 2 hours and recrystallised from methanol/acetone.

Yield: 1.1 g of a reddish blue powder.

Dyes 2, 4, 5, 6, 7, 8, 20 and 21 are also prepared by the process described above.

Preparation of Dye 11

1 g of 2-amino-6-chlorophenol-4-sulfonamide (Amine 12) (0.0045 mol) are diazotized using 3.8 ml of 10% sodium nitrite solution in 12 ml of 10% hydrochloric acid at 0° C. After removal of the nitrite excess, the reaction mixture is poured into a solution, cooled to 0° C., of 0.8 g of 3-methyl-isoquinolinol-4 (Coupler 5) and 3.2 g of sodium acetate in 20 ml of methanol and stirred overnight. The reaction mixture is suction filtered the next day and recrystallised from 30% acetic acid.

Yield: 1 g of a reddish violet powder.

Dyes 12, 13 and 19 are prepared by the method used for Dye 11.

Preparation of Dye 14

2.2 g of 2-amino-4-trifluoromethyl-6-nitrophenol (Amine 6) are diazotized, using
3 ml methanesulfonic acid and
1.45 ml (=1.25 g) of isoamyl nitrite in 30 ml of glacial acetic acid and 5 ml of propionic acid at 0° C.: After 40 minutes, 0.5 g of urea is added and after a further 5 minutes the reddish yellow solution is poured into
2 g of 3-methyl-isoquinolinol-4 (coupler 5) and
40 g of sodium acetate in
150 ml of methanol.

Stirring is continued overnight and the reaction mixture is diluted with 50 ml of water, adjusted to pH 6 using 20% $K_2CO_3$ solution and suction filtered.

The reaction product is purified by chromatography with methylene chloride/methanol over a column of silica gel. Yield: 1.58 g of blue powder (from isopropanol).

Dyes 18 and 21 are also prepared by the method employed for dye 14.

Preparation of Dye 23

(a) To prepare 2-amino-6-nitrophenol-4-sulfonamide (Amine 2), 7-nitro-2-methylbenzoxazole-5-sulfochloride obtained as an intermediate in the preparation of Amine 3 is digested using 20% aqueous $NH_3$ and subsequently treated with acetic acid containing 5% HCl.

(b) 2.35 g of Amine 2 (10 Mmol) are diazotized using (1.25 g) isoamyl nitrite in
30 ml glacial acetic acid,
4 ml propionic acid and
3 ml methane sulfonic acid at −5° C.

The excess of nitrous acid is removed using 0.5 g of urea and the reaction mixture is stirred into a solution maintained at −5° C., of 2.3 g of diphenylimidazole (coupler 9) and 10 g of KOH in 150 ml of methanol. The reaction mixture is kept alkaline by subsequent addition of a total of 30 g of KOH in 100 ml of methanol and stirring is continued. After the reaction mixture has been left to stand overnight, it is adjusted to pH 6 using hydrochloric acid and suction filtered.

Yield: 4.5 g of dye. 3 g of pure substance are obtained by chromatography over silica gel and reprecipitation with dimethylformamide/ethyl acetate.

Dye 26 is prepared in analogous manner.

(a)

2,3-dimethyl-5-propyl-6-[α-(2-methyl-5-aminophenyl)-sulfonyl]-tetradecyl-benzoquinone-(1,4)

30 ml of 20% sulfuric acid are added dropwise, with stirring, to 19.6 g of 2,3-dimethyl-5-propyl-6-(α-hydroxy)tetradecylhydroquinone (the preparation of which has been described in published European Patent Application No. 0 004 399) and 11.1 g of 2-methyl-6-aminobenzene sulfinic acid in 300 ml of glacial acetic acid. The temperature is maintained at 60° C. for 16 minutes, 30 g of iron(III)chloride hexahydrate are added and the temperature is then maintained at 60° C. for further 20 minutes. The reaction mixture is stirred 300 ml of water and suction filtered when crystallization has set in. The product is washed with water, digested using hot methanol again suction filtered and dried under vacuum. Yield: 28 g.

(b) 5.2 g of the quinone compound from (a) are reacted with 3.5 g of 7-nitro-2-methylbenzoxazole-5-sulfochloride (intermediate product of the preparation of Amine 3) in 50 ml of pyridine at from 5° to 10° C. for 30 hours. After the addition of 5 g of ice, stirring is continued for 1 hour and the product is precipitated by pouring the reaction mixture into water. According to the thin layer chromatograph the crude product consists of two components. After 3 hours digestion using 100 ml of glacial acetic acid and 2 ml of $H_2SO_4$, the paler yellow patch of the thin layer chromatogram has disappeared. The product is precipitated using 50 ml of water and purified by repeated methanol digestion in the presence of a small quantity of pyridine and water. Yield: 5.1 g of an orange colored powder.

(c) 5 g of 2-amino-6-nitrophenol compound from (b) are diazotized using 1 ml of isoamylnitrite at 0° C. in 100 ml of dioxane after the addition of 2 ml of methane sulfonic acid. After the reaction mixture has been left to stand for 2 hours, any excess of nitrous acid is removed using 1 g of urea in 5 ml of methanol, and the diazonium solution is introduced into a solution of 1.5 g of 2-aminopyridinol-3 (coupler 1) in 200 ml of methanol and 50 ml of pyridine in which 40 g of potassium carbonate are suspended.

Stirring is continued for 4 hours at 5° C. and the reaction mixture is poured into 300 g of ice. The precipitated dye releaser is ready for use after it has been stirred twice with, in each case, 100 ml of methanol and recrystallized from ethyl acetate/methanol.

Yield: 4.5 g of a bluish violet powder.

Dye releaser 1

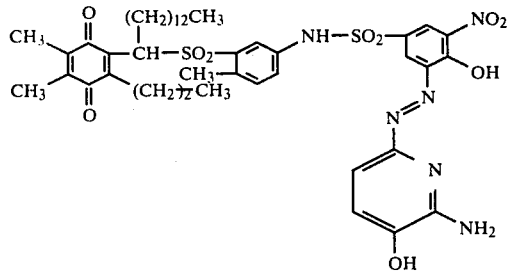

60

Dye releaser 2

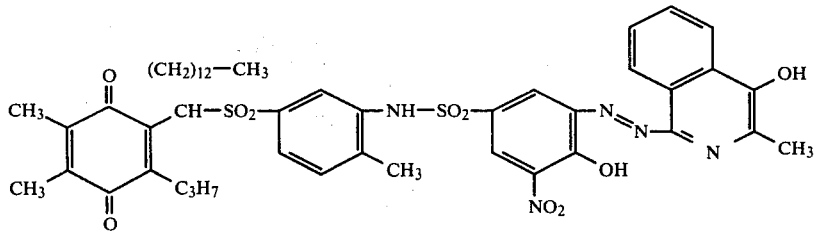

is prepared by coupling of the diazonium salt prepared under (c) on 3-methyl-4-isoquinolinol (coupler 5) in methanol/dioxane in the presence of sodium acetate; dark blue powder.

Dye releaser 3

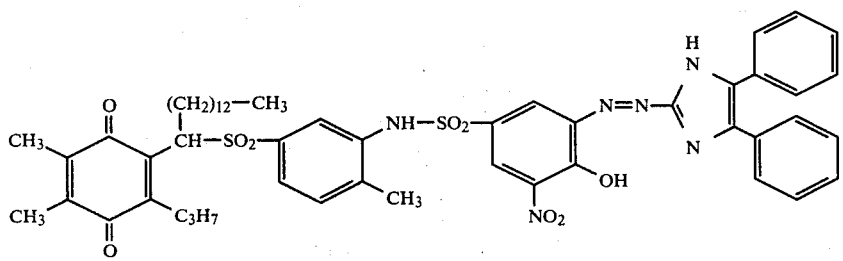

is prepared by coupling of the diazonium salt prepared under (c) on 4,5-diphenylimidazole (coupler 9) in dioxane/pyridine.

Dye releaser 4

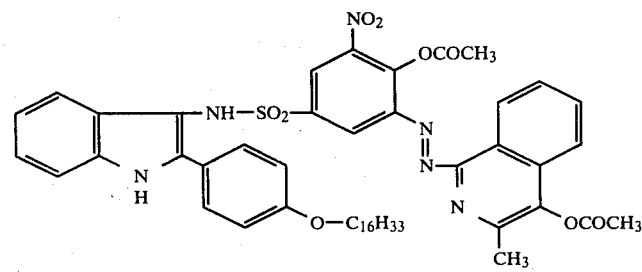

4.1 10 g of Dye 13 are acetylated using 20 ml of acetic anhydride in 70 ml of pyridine by 2 hours heating on a steam bath.

4.2.

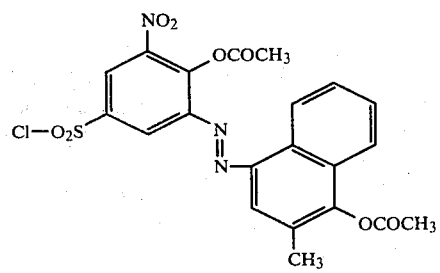

The crude product from 4.1 is stirred with 15 g of PCl$_5$ and 10 g of POCl$_3$ on a steam bath for 4 hours. THe mixture is then diluted with 200 ml of dichloromethane and poured into a mixture of 20 g of NaHCO$_3$ and 80 g of ice. The dichloromethane phase is dried, using a molecular sieve, and concentrated by evaporation undr a vacuum at a temperature of less than 20° C. Yield: 8.5 g.

4.3. The crude product from 4.2 is reacted with 6.5 g of 2-cetyloxyphenyl-3-aminoindole in 100 ml of dichloromethane and 50 ml of pyridine under nitrogen at room temperature. After it has been left to stand for 10 hours, the reaction mixture is diluted with 100 ml of dichloromethane and treated with 120 ml of 20% hydrochloric acid. The aqueous solution is adjusted to pH 3 using sodium acetate and separated. The dichloromethane phase is dried by means of a molecular sieve and chromatographed on silica gel. 6 g of a chromatographically-uniform substance is obtained in the form of a red powder.

Dye releaser 5
Intermediate stage

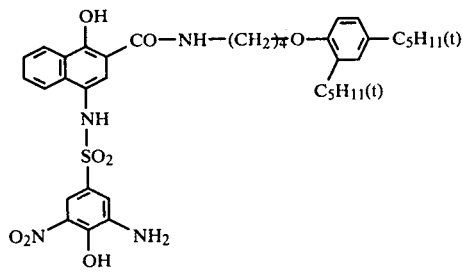

was prepared by raction of the nitrobenzoxazole sulfochloride required as intermediate for Amine 3 with 4-amino-1-hydroxy-N-[4-(2,4-di-tert.-pentyl-phenoxy)-butyl]-2-naphthamide (U.S. Pat. No. 3,954,476) and gentle saponification with aqueous hydrochloric acid in acetic acid/chloroform 1:1.

Dye releaser 5

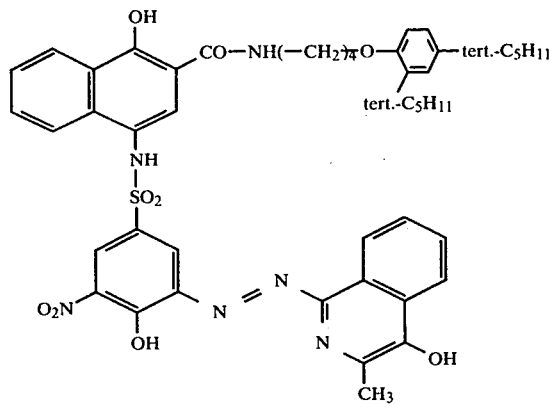

was prepared on the basis of the method described in U.S. Pat. No. 4,148,642, page 27, lines 20–40, by diazotization of the amine prepared in the intermediate stage with HCl+methanol/isoamyl nitrite in 30 times the volume of acetone and coupling with 3-methyl-4-isoquinolinol after addition of sodium acetate in methanol, using a quantity of sodium acetate equimolar to the quantity of HCl, and the reaction product was isolated by stirring into water. To purify the product, it was separated between dimethylformamide and cyclohexane under nitrogen, and after further precipitation with water and drying in dichloromethane/isopropanol, it was chromatographed on silica gel. After concentration by evaporation under nitrogen, dye releaser 5 precipitates in the form of a powder which is a uniform substance according to thin layer chromatography and is readily soluble in ethyl acetate to form a blue solution.

Dye releaser 6

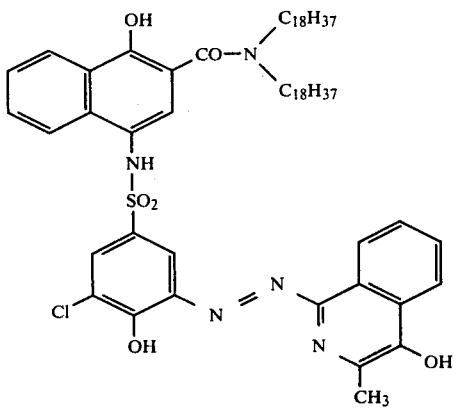

was prepared as described above by coupling of 2-chloro-6-aminophenol-4-sulfonic acid-4-hydroxy-3-bis-octadecylaminocarbonyl-naphthylamide on 3-methyl-4-isoquinolinol; violet powder readily soluble in ethyl acetate.

The dye releasers according to the present invention are incorporated in a color photographic recording material for the dye diffusion transfer process, in which they are associated with a light-sensitive silver halide emulsion layer. Such a recording material used for a monochromatic process contains at least one light-sensitive silver halide emulsion layer while a material of this type used for the production of multicolored images generally contains at least three light-sensitive silver halide emulsion layers which in the latter case differ from each other in spectral sensitivity. According to the present invention, a dye releaser corresponding to general formula VI is associated with at least one of these layers. When developed, the dye releasers give rise to diffusible dyes which, after diffusion into an image receptor layer containing nickel or copper ions, are complexed to form cyan dyes. The dye releasers according to the present invention are therefore preferably associated with a red-sensitive silver halide emulsion layer.

The terms "association" and "associated" are to be understood to mean that the light-sensitive silver halide emulsion layer and the dye releaser are so arranged in relation to each other that, when development takes place, they are capable of interacting so that the diffusible azo dye which has been converted into a complex by metal ions may be released as a function of the development of the silver halide emulsion layer. The light-sensitive silver halide and the dye releaser need not necessarily be present in the same layer for this purpose. They may be accommodated in adjacent layers both belonging to the same layer unit.

In cases where the dye releasers according to the present invention are reducible compounds capable of being split by reduction, which compounds have preferably been used together with ED compounds (or precursors thereof, e.g. according to German Offenlegungsschrift 30 06 268 the term "association" should be taken to mean that the silver halide emulsions, the ED compound or ED precursor, compound and the dye releaser are so arranged in relation to each other that they are capable of interaction to produce, on the one hand, an imagewise correspondence between the silver image formed and the consumption of ED compound and, on the other hand, between unused ED compound and the dye releaser, with the result that imagewise distribution of diffusible dye is obtained in correspondence with the undeveloped silver halide.

Although various methods may be used for incorporating the dye releasers according to the present invention, it has been found advantageous to incorporate them in the layers in the form of emulsions, using so-called "oil-formers". This has the advantage, particularly when reducible dye releasable compounds capable of being split by reduction are used in combination with ED compounds, that the dye releasers and the ED compounds may be brought into very close functional contact in the form of a common emulsion. Suitable oil-formers have been described, for example in U.S. Pat. No. 2,322,027 and German Offenlegungsschrift Nos. 1,772,192, 2,042,659 and 2,049,689. The optimum quantities of dye releaser to be incorporated and ED compound, if used, may be determined by simple routine tests. The dye releaser according to the present invention may be used, for example, in quantities of from 0.05 to 0.2 mol and the ED compound, if present, may be used in quantities of 0.1 to 0.6 mol per mol of silver halide.

Development of the color photographic recording material according to the present invention, after its imagewise exposure, is initiated by treatment with an aqueous alkaline developer solution which may be highly viscous. The auxiliary developer compounds required for development are either present in the developer solution or may be partly or completely contained in one or more layers of the color photographic recording material according to the present invention. When development takes place, diffusible dyes are released imagewise from the dye releasers and transferred to an image receptor layer which is either an integral constituent of the color photographic recording material according to the present invention or is in close contact with this material, at least during development. The image receptor layer may therefore be arranged on the same layer support as the light-sensitive element or on a separate layer support.

It consists essentially of a binder containing mordant for fixing the diffusible dyes released from the non-diffusible dye releasers. The mordants for anionic dyes are preferably long-chain quaternary ammonium or phosphonium compounds or tertiary sulfonium compounds, e.g. those described in U.S. Pat. Nos. 3,721,147 and 3,271,148. Certain metal salts and hydroxides thereof which form difficulty soluble compounds with the acid dyes may also be used. Polymeric binders should also be mentioned in this context, for example those described in German Offenlegungsschrift Nos. 2,315,304, 2,631,521 or 29 41 818. The layer of mordant contains the dye mordants dispersed in one of the conventional hydrophilic bonders, such as gelatine, polyvinyl pyrrolidone or partially or completely hydrolysed cellulose esters. Some binders are, of course, capable of functioning as mordants, such as copolymers of quaternary nitrogen bases, e.g. polymers of N-methyl-2-vinyl pyridine as described, for example, in U.S. Pat. No. 2,484,430. Further examples of suitable mordanting binders include guanyl hydrazone derivatives of alkyl vinyl ketone polymers as described, for example, in U.S. Pat. No. 2,882,156, and guanyl hydrazone derivatives of acyl styrene polymers, as described for example, in German Offenlegungsschrift No. 2,009,498, but the last-mentioned mordant binders would generally be used in combination with other binders e.g. gelatine.

In the present case, the image receptor layer or a layer adjacent thereto may contain heavy metal ions, in particular ions of copper or nickel, to react with the tridentate azo dyes according to the present invention diffusing into the layer to form the corresponding azo dye-metal complexes which have the advantageous characteristics mentioned above as regards absorption and stability. The metal ions may be bound in the form of complexes in the image receptor layer, e.g. they may be bound to certain polymers as described, for example, in Research Disclosure 18 534 (September 1979) or in German Offenlegungsschrift No. 30 02 287. Alternatively, the complex of azo dye-metal may be produced in the image receptor layer after diffusion by treating the image receptor layer, now containing the imagewise distribution of dyes according to the present invention, with a solution of a salt of one of the above-mentioned heavy metals. In either case, the dye image produced by means of the color photographic material according to the present invention consists of an imagewise distribution of metal complexes, in particular of nickel or copper complexes of the azo dye corresponding to general formula II released from the dye releasers according to the present invention and optionally also other dyes which have been fixed in the image receptor layer by the mordants contained therein.

In cases where the image receptor layer is left in contact with the light-sensitive element after completed development, an alkali-permeable light-reflective layer of binder containing pigment is generally situated between the aforesaid image-receptor layer and light-sensitive element. This layer of binder serves as an optical separation between the negative and the positive and as a visually attractive background for the transferred color image. Such a light-reflective layer may be preformed in known manner in the light-sensitive color photographic recording material or it may be produced, also in known manner, in the course of development. If the image-receptor layer is arranged between the layer support and the light-sensitive element and is separated from the latter by a preformed light-reflective layer, then the layer support must either be transparent so that the dye transfer image produced may be viewed through it or the light sensitive element together with the light-reflective layer must be removed from the image-receptor layer to expose the latter. On the other hand, the image-receptor layer may be arranged as the uppermost layer in an integral color photographic recording material, in which case exposure is advantageously carried out through the transparent layer support.

EXAMPLE OF APPLICATION 1

Image receptor sheet 1

The following layers were applied to a paper support which was coated with polyethylene on both sides and covered with an adhesive layer. The figures given apply to 1 m².

1. A mordant layer containing 6 g of a polyurethane according to Example 3 of German Offenlegungsschrift No. 2,631,521 and 5 g of gelatine.
2. A layer of hardener containing 0.1 g of gelatine and 0.15 g of an instant hardener corresponding to the following formula:

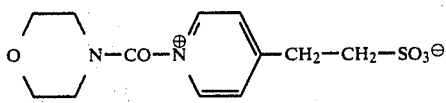

5

Using several strips of the image receptor material, each strip was dipped into a 0.003 molar solution, made alkaline with 2% NaOH, of one of the dyes 1, 2, 4, 5, 10, 11, 12, 13, 14, 16, 18, 22, 23 or 26 or one of the comparison dyes A, B, C, D, E or F described below which are not in accordance with the present invention, and each strip was colored to a density of 1-1.2 (measured in a Macbeth RD 514 Reflection Densitometer behind a green filter).

Comparison dyes not in accordance with the present invention

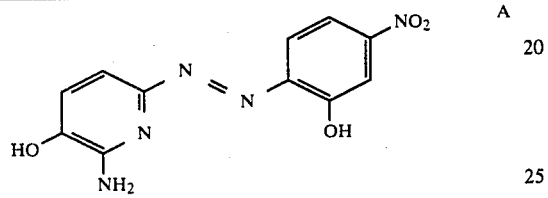

A

German Offenlegungsschrift No. 2,740,719.

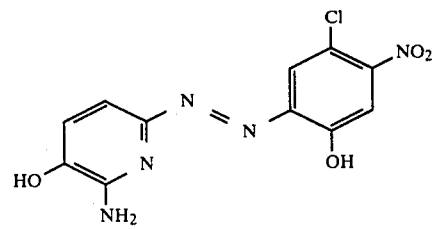

B

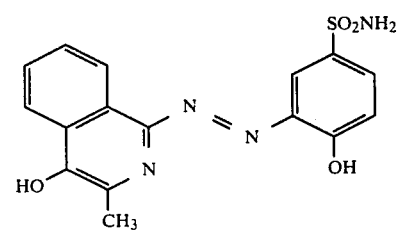

C

German Offenlegungsschrift No. 2,740,719.

-continued
Comparison dyes not in accordance with the present invention

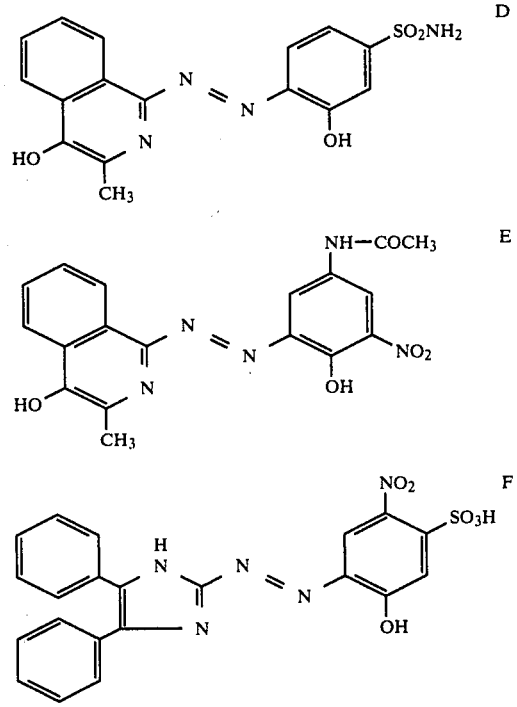

When the immersion treatment has been completed, the samples are rinsed with deionized water and metallized by immersion in a 2% metal salt solution for 5 seconds:

Dyes 1, 2, 4, 5, 10, 11, 12, 13, 14, 16, 18 and 22 A, B, C, D and E are treated with nickel acetate solution.

Dyes 11, 13, 16, 23, 26, A, C, D and F are treated with copper acetate solution.

All samples are then rinsed under running water, subsequently treated with a 2% succinic acid buffer solution (adjusted to pH 6) and dried.

The results of the spectral measurements are summarized below:

TABLE 1

| Dye | $\lambda_{Max}$ [nm] | Half band width [nm] | Nickel complexes Side densities behind | | Color | impression |
|---|---|---|---|---|---|---|
| | | | Blue filter | Green filter (Macbeth RD 514) | | |
| 1 | 638 | 544–678 | 23% | 45% | b | C |
| 2 | 631 | 542–674 | 24% | 48% | b | C |
| 4 | 630 | 544–670 | 30% | 50% | b | C |
| 5 | 624 | 534–666 | 28% | 51% | b | C |
| 10 | 650 | 562–690 | 19% | 33% | cy | C |
| 11 | 650 | 562–680 | 18% | 34% | cy | C |
| 12 | 675 | 570–705 | 19% | 32% | gcy | VC |
| 13 | 670 | 566–719 | 19% | 29% | gcy | VC |
| 14 | 665 | 562–688 | 21% | 33% | gcy | C |
| 16 | 648 | 555–694 | 18% | 34% | cy | VC |
| 18 | 655 | 558–690 | 18% | 35% | cy | C |
| 22 | 675 | 560–>730 | 20% | 35% | cy | C |
| A | 654 | 536–714 | 56% | 58% | cy | VD |
| B | 620 | 544–706 | | | b | VD |
| C | 648 | 557–684 | 23% | 38% | b | C |
| D | 655 | 556–690 | 31% | 39% | b | Cl |
| E | 668 | 573–>730 | 35% | 38% | gcy | Cl |

The color impression was assessed as follows:

b: visually too blue
cy: pure cyan
gcy: greenish cyan
C: clear
VC: very clear
Cl: cloudy
VD: very dull in a Macbeth RD 514 Reflection Densitometer behind a red filter). The strips are subsequently treated with 2% succinic acid buffer (pH 6) and dried.

TABLE 3

| Dye | λ max | Half band width | Side densities behind Blue filter | Side densities behind Green filter | Color | impression |
|---|---|---|---|---|---|---|
| 1 | 625 | 530–685 | 32% | 40% | b | Cl |
| 2 | 620 | 530–695 | 33% |  | b | Cl |
| 4 | 628 | 530–680 | — |  | b | Cl |
| 11 | 635 | 550–680 | 28% | 38% | b | C |
| 12 | 655 | 568–700 | 32% | 42% | cy | C |
| 13 | 657 | 560–710 | 32% |  | cy | C |
| A | 640 | 500–>730 | 54% | 54% | cy | VD |
| C | 626 | 544–670 | 34% | 48% | b | Cl |
| D | 635 | 544–700 | 38% | 50% | cy | VD |

For color impressions, see Table of Example 1.

All transfers of dyes to the metallising image-receptor layer 2 in accordance with the known art (published European Patent Application NO. 4911) give a bluer and duller impression than those obtained on image-

TABLE 2

| Dye | λ max [nm] | Half band width [nm] | Copper complexes (Macbeth RD 514) Side densities behind Blue filter | Copper complexes (Macbeth RD 514) Side densities behind Green filter | Color | impression |
|---|---|---|---|---|---|---|
| 11 | 650 | 562–710 | 27% | 35% | cy | C |
| 13 | 665 | 565–710 | 28% | 42% | cy | C |
| 16 | 640 | 560–690 | 26% | 41% | cy | C |
| 23 | 626 | 543–695 | 27% | 48% | cy | C |
| 26 | 640 | 540–>720 | 33% | 45% | cy | Cl |
| A | 660 | 520–>700 | — | — | cy | VD |
| C | 650 | 555–680 | 20% | 38% | cy | C |
| D | 660 | 555–710 | 30% | 40% | cy | Cl |
| E | 645 | 529–710 | 33% | 51% | cy | VD |

The results both of visual assessment and of measurement of all the spectral data show that dyes having the substitution pattern according to the present invention in the phenyl portion (=diazo portion) give shades of superior clarity when metallized with nickel and that greater clarity of the shade may also be seen in the case of copper complexes. The side densities are generally high both in dyes known in the art and in new dyes having a different substitution pattern from that according to the present invention.

EXAMPLE OF APPLICATION 2

Image receptor sheet 2

The following layers are applied to a paper support coated with polystyrene on both sides and covered with an adhesive layer (FIGS. refer to 1 m$^2$).
(1) A metal donor layer containing 1.5 g of nickel acetate and 0.8 g of gelatine,
(2) a mordant layer containing 5 g of polyvinylimidazole acetate and 5 g of gelatine,
(3) a hardener layer containing 0.1 g of gelatine and 0.15 g of an instant hardener corresponding to the following formula:

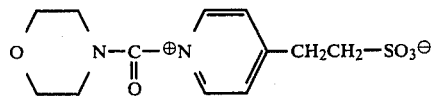

Several strips of image-receptor material are immersed each into a 0.003 molar solution, made alkaline with 2% NaOH, of one of the dyes indicated in the following Table, and colored to a density of 1.2 to 1.5 (determined receptor layer 1 (brownish foundation and shortwave shift of the absorption maxima). The quality differences between the dyes according to the present invention and dyes corresponding to the known art are nevertheless clearly visible.

EXAMPLE OF APPLICATION 3

Light-sensitive element 1 (not according to the present invention)

The following layers were applied successively to a paper support coated with polyethylene on both sides: All figures given refer to 1 m$^2$.
1. A red-sensitized silver iodobromide emulsion layer prepared from 0.5 g of AgNO$_3$ and containing 0.3 g of the dye releaser A which is not in accordance with the present invention (=compound 2 from German Offenlegungsschrift No. 2,854,946), 0.16 g of ED compound 6 (=compound 4 of German Offenlegungsschrift No. 30 06 268), 0.46 g of palmitic acid diethylamide (common oil-former for A and B) and 1.15 g of gelatine.
2. A protective layer containing 0.6 g of the mono acetylation product of 4-methyl-4-hydroxymethylphenidone, 0.12 g of 2-isooctadecyl-5-sulfohydroquinone and 0.6 g of gelatine.
3. A hardening layer containing 0.1 g of gelatine and 0.12 g of instant hardener, see Example 1.

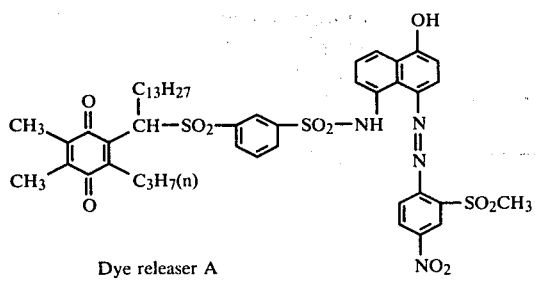

Dye releaser A

Image-receptor sheet 1, consisting of
1. Mordanting layer containing 6 g of a polyurethane according to Example 3 of German Offenlegungsschrift No. 2,631,521 and 5 g of gelatine.
2. Hardening layer containing 0.1 g of gelatine and 0.15 g of hardener C.

The light-sensitive element which had been exposed through a step wedge and the image-receptor sheet were steeped in a treatment solution having the composition indicated below and then pressed together with the active surfaces thereof in contact:

| | |
|---|---|
| 925 g | $H_2O$ |
| 30 g | isobutanol |
| 2 g | $Na_2SO_3$ |
| 3 g | KBr |
| 40 g | KOH. |

After a contact time of 2 minutes, the sheets were separated and the image-receptor sheet was washed for 30 seconds. After drying, the Dmin/Dmax values of the positive cyan image were determined.

Light-sensitive elements 2 to 4: (according to the present invention)

The light-sensitive elements 2 to 4 differ from element 1 in that

| | |
|---|---|
| Light-sensitive element 2 contains: | 0.4 g of dye releaser 1 and 0.2 g of ED compound 6; |
| Light-sensitive element 3 contains: | 0.4 g of dye releaser 2 and 0.25 g of ED compound 6, |
| and | |
| Light sensitive element 4 contains: | 0.45 g of dye releaser 3, and 0.25 g of ED compound 6. |

In addition, the emulsions in each case contained 0.9 g of palmitic acid diethylamide instead of 0.46 g of palmitic acid diethylamide. The light-sensitive element was worked-up, as in the case of light-sensitive element 1, in contact with the image-receptor layer 1. After separation of the layers, the image-receptor layers were washed with deionized water and metallized by immersion in a 2% nickel acetate solution (for light-sensitive elements 2 and 3) or a 2% copper acetate solution (for light-sensitive element 4). They were then neutralized by a succinic acid buffer bath (2% succinic acid adjusted to pH 6.0) and dried.

Color wedges 1 to 4 obtained were covered on half the side and exposed to Xenon arc lights for 48 hours (4.8 . $10^6$ Lux hours).

The data obtained are summarised in the following Table.

| Light-sensitive element | Dye releaser | $D_{min}$ | $D_{max}$ | E | $\frac{\Delta D}{D_o}$ |
|---|---|---|---|---|---|
| 1 | A | 0.2 | 2.05 | 100 | −80% |
| 2 | 1 | 0.2 | 1.9 | 85 | −15% |
| 3 | 2 | 0.18 | 2.0 | 80 | −30% |
| 4 | 3 | 0.22 | | 100 | −15% |

The sensitivity E in column 5 is given in relative log I · t units.
The percentage reduction in density on exposure to Xenon light (4.8 · $10^6$ Lux hours) is entered in column 6.

EXAMPLE OF APPLICATION 4

Light-sensitive elements 5 to 7 were prepared by successive application of the following layers to a transparent polyester support (quantities refer to 1 $m^2$);
(1) Metal donor layer containing 2 g of nickel pentadecenylsuccinate and 2.5 g of gelatine.
(2) Mordanting layer containing 2.5 g of cationic polyurethane according to Example 3 of German Offenlegungsschrift No. 2,631,521 and 3 g of gelatine.
(3) Reflective layer containing 18 g of $TiO_2$ and 1.8 g of gelatine.
(4) Dye-releasing layer containing
(4.1) light-sensitive element 5: 0.5 g of dye releaser 4, 0.05 g of potassium octadecylhydroquinone sulfonate and 0.5 g of gelatine
(4.2.) light-sensitive element 6: 0.5 g of dye releaser 5, 0.05 g of potassium octadecylhydroquinone sulfonate and 0.5 g of gelatine
(4.3.) light-sensitive element 7: 0.5 g of dye releaser 7, 0.05 g of potassium octadecylhydroquinone sulfonate and 0.05 g of gelatine
(5) A red-sensitized, unfogged direct positive emulsion containing octahedral silver bromide crystals measuring 1.3 μm, 1.5 g of $AgNO_3$, 0.003 g of fogging agent corresponding to the following formula:

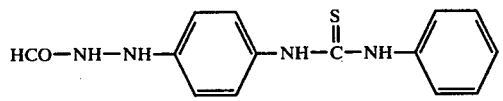

and 1.4 g of gelatine.
(6) A hardening layer containing 0.6 g of gelatine and 0.2 g of instant hardener according to Example of application 1.

One strip of each of the light-sensitive elements 5, 6 and 7 was exposed behind a step wedge and passed through a pair of squeezing rollers together with a bag of paste, a neutralizing sheet and two laterally placed spacer strips each 140 μm in thickness.

The element was separated after 10 minutes at 25° C. and washed to remove any paste adhering to it.

The developer paste had the following composition:

| | |
|---|---|
| 1.6 g | sodium sulfite |
| 2.8 g | 5-methyl benzotriazole |
| 8.4 g | hydroxymethyl methyl phenidone |
| 0.3 g | tert.-butyl-hydroquinone |
| 0.2 g | methyl hydroquinone |
| 1.0 g | cyclohexanol |
| 40.0 g | carboxymethyl cellulose |
| 47.0 g | potassium hydroxide |
| 5.0 g | potassium fluoride |
| made up with water to 1000 g. | |

Three positive cyan dye images having the following sensitometric data are obtained:

| Light-sensitive element | $D_{max}$ | $D_{min}$ | log I.t |
|---|---|---|---|
| 5 | 1.65 | 0.18 | 85 |
| 6 | 1.55 | 0.20 | 90 |
| 7 | 1.70 | 0.15 | 100 |

We claim:

1. The color photographic recording material for the production of color images by the dye diffusion transfer process, containing at least one light-sensitive silver halide emulsion layer and a non-diffusible color-providing compound associated with said light-sensitive layer from which color-providing compound a diffusible azo dye which is capable of forming a complex with metal ions is released under the conditions of alkaline development as a function of the development of the silver halide emulsion layer, wherein the improvement comprises the azo dye corresponds to the following general formula II:

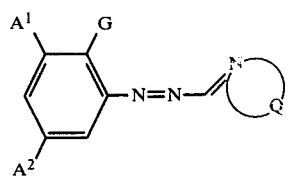

wherein
  $A^1$ and $A^2$ represent electronegative substituents whose metasigma values $\sigma m$, which are defined as follows:
  $\sigma_m = \log K_m - \log K°$ where
  $\sigma_m$ is a constant for a given substituent (meta in this case)
  $K_m$ is the ionization constant for a meta substituted benzoic acid in water at 25° C. and
  $K°$ is the ionization constant for the benzoic acid itself,
conform to at least one of the following three relationships:
  1. $\sigma_m(A^1)$, $\sigma_m(A^2) \geq +0.33$
  2. $\sigma_m(A^1)$, $+\sigma_m(A^2) \geq +0.75$;
  3. $\sigma_m(A^1) \geq +0.33$ and
  $A^2$ represents —SO₂X wherein
  X represents H, —OH, —NH₂, —NH—Y or a cyclic amino group and
  Y represents alkyl, aryl, alkylsulfonyl, arylsulfonyl or acyl,
  Q represents a group for completing a 2-amino-3-hydroxypyridine ring, a 4,5-diphenylimidazole ring or a 4-hydroxyisoquinoline ring which is attached through the 1-position; and
  G represents a group capable of chelate formation.

2. Recording material as claimed in claim 1, wherein $A^1$ and $A^2$ represent halogen, —NO₂, —CN, —CF₃, —OCF₃, —CO—R (R represents H, alkyl, aryl), —COOR (R represents alkyl), —CO—NR¹R² ($R^1$ represents H, alkyl, aryl; $R^2$ represents H, alkyl; or $R^1$ and $R^2$ represent groups for completing a cyclic amino group), —SO₂—R (R represents alkyl, aryl), —SO—NR¹R² (R represents H, alkyl, aralkyl, aryl; $R^2$ represents H, alkyl; or $R^1$ and $R^2$ represent groups for completing a cyclic amino group), or

($R^1$, $R^2$ represent alkyl, or $R^1$ and $R^2$ represent 1,2- or 1,3-alkylene).

3. Recording material as claimed in claim 1 wherein $A^2$ represents a sulfamoyl group, a sulfo group or a disulfimide group corresponding to the following general formula:

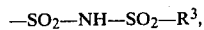

wherein
  $R^3$ represents alkyl or aryl.

4. Recording material as claimed in claim 3 wherein $A^2$ represents a group corresponding to the following formula

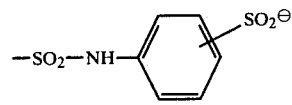

5. Recording material as claimed in one of the claims 1 to 4 wherein G represents a hydroxyl group.

* * * * *